United States Patent
Colyer et al.

(10) Patent No.: US 6,745,196 B1
(45) Date of Patent: Jun. 1, 2004

(54) METHOD AND APPARATUS FOR MAPPING A COMMUNITY THROUGH USER INTERACTIONS ON A COMPUTER NETWORK

(75) Inventors: Wallace Colyer, Campbell, CA (US); Tapan Bhat, Palo Alto, CA (US); Charles DiFatta, III, Los Gatos, CA (US); David J. Stubenvoll, San Jose, CA (US); Fangyao Zhen, Santa Clara, CA (US)

(73) Assignee: Intuit, Inc., Mountain View, CA (US)

( * ) Notice: Subject to any disclaimer, the term of this patent is extended or adjusted under 35 U.S.C. 154(b) by 337 days.

(21) Appl. No.: 09/684,547

(22) Filed: Oct. 6, 2000

Related U.S. Application Data
(60) Provisional application No. 60/158,314, filed on Oct. 8, 1999.

(51) Int. Cl.[7] ............................................. G06F 17/30
(52) U.S. Cl. .................... 707/102; 707/10; 707/100; 709/203
(58) Field of Search ............................. 707/102, 3, 9, 707/10, 100, 104.1; 709/203

(56) References Cited

U.S. PATENT DOCUMENTS

| | | | | |
|---|---|---|---|---|
| 5,813,006 A | * | 9/1998 | Polnerow et al. | 707/10 |
| 5,911,687 A | * | 6/1999 | Sato et al. | 600/300 |
| 5,915,248 A | * | 6/1999 | Kinoshita et al. | 707/1 |
| 5,933,811 A | * | 8/1999 | Angles et al. | 705/14 |
| 5,948,040 A | * | 9/1999 | DeLorme et al. | 701/201 |
| 5,950,200 A | * | 9/1999 | Sudai et al. | 707/9 |
| 5,970,475 A | * | 10/1999 | Barnes et al. | 705/27 |
| 6,178,424 B1 | * | 1/2001 | Okumura et al. | 707/10 |
| 6,289,348 B1 | * | 9/2001 | Richard et al. | 707/10 |
| 6,360,222 B1 | * | 3/2002 | Quinn | 707/100 |

FOREIGN PATENT DOCUMENTS

| EP | 99303416.4 | * | 3/1999 | ............ G06F/17/60 |

* cited by examiner

*Primary Examiner*—John Breene
*Assistant Examiner*—Cheryl Lewis
(74) *Attorney, Agent, or Firm*—Fenwick & West LLP

(57) ABSTRACT

A system for building a database that stores information representative of the organizational structure of a community of users of a computer network is disclosed. The system uses an online computer applications service that facilitates the initiation and completion of transactions between users in the community. Initially, a first user from the community registers on the computer applications service and information representative of the first user is stored in the database. Next, a first transaction record is created in the database from information inputted by the first registered user. The first transaction record includes at least one field representing an identity of a first unregistered user in the community, a field representing a role of the first registered user in the first transaction, and a field representing a role of the first unregistered user in the first transaction. After creation of the first transaction record, the first unregistered user is invited to register with the service when information representative of the first transaction is sent to the first unregistered user. In response to this invitation, the first unregistered user registers with the service and information representative of the first unregistered user is stored in the database, thereby transforming the first unregistered user into a second registered user. After registration of the second user, further users from the community are invited onto the service and registered on the database by repeating the above process.

13 Claims, 23 Drawing Sheets

From: XXXXXXXX @XXXX.com
Sent: Monday, October 11, 1999 4:33 PM
To: XXXXXXXXXXXXX
Subject: Purchase Request This message is from Freeworks.com on behalf of XXXX, who has submitted a Purchase Request to you.

To view and take action on this item, register for Freeworks.com FREE services at:
http://www.freeworks.com/user/userReg.asp?verifyid=_____&CODE=INVITE Upon registering, you'll be able to get started with Purchase Request right away.

Why Freeworks.com?

Reduce the time and hassle of everyday paperwork with Freeworks.com, a new FREE service! Freeworks.com acts as your 24-hour-a-day personal assistant by taking care of the filling out, filing, and distribution of your paperwork.

Freeworks.com helps you rocket through paperwork with:

* Preset forms that complete themselves. Everything from expense reports and vacation requests to sick days and time tracking is point-and-click simple.

* Automatic distribution of forms. Receipt, review and approval have never been easier! Let Freeworks.com handle it all automatically via e-mail!

* Tracks work automatically. See the status of your work and work assigned to others—all in one view.

* Easy for you. Nothing new to learn, no complicated sign-on, no hidden costs. Just do business as you do now and we handle the paperwork.

* It's for everyone! From office managers to the finance and sales departments—anyone in your office can use Freeworks.

Register for your free personal Freeworks.com account now and start getting through your paperwork in a snap:
http://www.freeworks.com/user/userReg.asp?verifyid=_____&CODE=INVITE Thanks, The Freeworks.com Team

FIG. 1B

Freeworks.com

October 13, 1999                                                                 logout

My Freeworks       👉  Assign an Action item

Report A Bug

| Brief description: | _____ |
|---|---|
| Assignee: | _____ [e-mail address] |
| Due date: | October ▽  13 ▽  1999 |
| High priority: | ☐ |
| Note: | |

Get It done...
Add a To-Do
▶ *Assign an Action Item*
Employee List
Expense Report
Purchase Request
Travel Request
Vacation Request

◁

*Required Field  [Assign] [Cancel]

Tell a Friend

Resources
Finance
Human Resources
Legal Management
Office Management
Sales & Marketing
Vendor Management

Site
Help & Support
My Account
Logout

© 1999 BCDS, Inc.     Your Privacy | About Us | Jobs@ Freeworks.com
By accessing and using this site you agree to our Terms of Service.

FIG. 1C

Because you can't expense the time that you spend filling out expense reports.

Freeworks.com

October 13, 1999                                                                 logout

My Freeworks  Vacation Request

Report A Bug

| Brief description: | |
|---|---|
| Vacation type: | ◉ [normal vacation ▽] |
| | ○ Other: [          ] |
| Vacation start: | [Oct ▽] [14 ▽] [1999 ▽] |
| Vacation end: | [Oct ▽] [15 ▽] [1999 ▽] |
| Total days of vacation used: | [     ] |
| Approver:* | XXXXX @ XXXX.com |
| Approval needed: | [Oct ▽] [13 ▽] [1999 ▽] |
| High priority: | ☐ |
| Note: | |

Get It done...
Add a To-Do
Assign an Action Item
Employee List
Expense Report
Purchase Request
Travel Request
▶*Vacation Request*

Tell a Friend

Resources
Finance
Human Resources
Legal
Management
Office Management
Sales & Marketing
Vendor Management

Site
Help & Support
My Account
Logout

*Required Field  [Assign] [Cancel]

© 1999 BCDS, Inc.    Your Privacy | About Us | Jobs@ Freeworks.com
By accessing and using this site you agree to our Terms of Service.

Freeworks PREVIEW .com | Because you can't expense the time that you spend filling out expense reports. | Freeworks .com October 13, 1999     logout

| My Freeworks |
|---|
| 1 New |
| 0 Overdue |

Create new...
- ☞ Action Item
- 📝 To-Do
- 💵 Expense Report
- 💰 Purchase Request
- ✈ Travel Request
- 🌴 Vacation Request

Report A Bug

| Get It done... |
|---|
| Add a To-Do |
| Assign an Action Item |
| Employee List |
| Expense Report |
| Purchase Request |
| Travel Request |
| Vacation Request |

Tell a Friend

| Resources |
|---|
| Finance |
| Human Resources |
| Legal |
| Management |
| Office Management |
| Sales & Marketing |
| Vendor Management |

| Site |
|---|
| Help & Support |
| My Account |
| Logout |

My Action Items | Items I'm Waiting On | Completed Items

| ! | Type | Description | Done Date | Status |
|---|---|---|---|---|
| ! | 💰 | Relaxation | 10/11/99 | Done |
| ! | ✈ | living in a small cabin, without ru... | | Done |

< prev 10    show all    next 10>

Employee Lists

Create New List

© 1999 BCDS, Inc.    Your Privacy | About Us | Jobs@ Freeworks.com

By accessing and using this site you agree to our Terms of Service.

FIG. 1I

October 13, 1999 logout

My Freeworks

Purchase Request

Report A Bug

Purchase Request Details

| | | | |
|---|---|---|---|
| Purpose: | Relaxation | | |
| Requester: | XXX@XX.com | Request date: | 10/11/00 |
| Priority: | High | Status: | Done |
| Project/account: | Techlex | | |
| Note: | | | |

Get It done...
Add a To-Do
Assign an Action Item
Employee List
Expense Report
▶ *Purchase Request*
Travel Request
Vacation Request

Purchase Item Details

| Description | Quantity | Each | Est. Cost |
|---|---|---|---|
| Porsche 911 Turbo | 1 | $ 85,000.00 | $ 85,000.00 |
| Total | 1 | | $ 85,000.00 |

Recommended Vendor

| | | | |
|---|---|---|---|
| Name: | | | |
| Contact: | | Phone: | |
| Address: | | Fax: | |
| | | E-mail: | |

Tell a Friend

Resources
Finance
Human Resources
Legal
Management
Office Management
Sales & Marketing
Vendor Management

History

| | | | |
|---|---|---|---|
| Assigned to: | XXX@XX.com | Status: | Rejected |
| Assigned: | 10/11/99 Viewed: 10/13/99 11:31:18 AM | Completed: | 10/11/99 |
| Notes: | Refusing | | |

Site
Help & Support
My Account
Logout

© 1999 BCDS, Inc.   Your Privacy | About Us | Jobs@ Freeworks.com

By accessing and using this site you agree to our Terms of Service.

FIG. 1J

| ENTITY (250) |
|---|
| EID (254A)<br>OWNERID (254D) |

| E_SECURITY (240) |
|---|
| EID (244A)<br>E_SEC_PASSWORD (244B)<br>E_MAIL (244C)<br>E_STATUS_ID (244D)<br>E_SEC_VERIFIED (244E)<br>E_SEC_REDGATE (244F)<br>E_SEC_VALIDKEY (244G)<br>E_INVITED_BY (244H)<br>E_NUMBER_INVITED (244I)<br>E_INVITATION_LEVEL (244J)<br>E_NUMBER_SIGNEDUP (244K)<br>E_ORIGINAL_INVITOR (244L)<br>SRCID (244M)<br>E_ORGANIC_TOTAL_INVITED (244N)<br>E_ORGANIC_TOTAL_SIGNEDUP (244O) |

| E_CONTACT (230) |
|---|
| EID (234A)<br>E_HOME_ADDR1 (234B)<br>E_HOME_ADDR2 (234C)<br>E_HOME_CITY (234D)<br>E_HOME_COUNTY (234E)<br>E_HOME_STATE (234F)<br>E_HOME_ZIP (234G)<br>E_HOME_PHONE (234H)<br>E_HOME_FAX (234I)<br>E_WORK_ADDR_ADD (234J)<br>E_WORK_MAILSTOP (234K)<br>E_WORK_ADDR1 (234L)<br>E_WORK_ADDR2 (234M)<br>E_WORK_COUNTY (234N)<br>E_WORK_STATE (234O)<br>E_WORK_ZIP (234P)<br>E_WORK_COUNTRY (234Q)<br>E_WORK_PHONE (234R)<br>E_WORK_PHONE_EXT (234S)<br>E_WORK_FAX (234T) |

| RELATIONSHIPS (260) |
|---|
| EID (264A)<br>MANAGER_EID (264B)<br>ACCOUNTING_EID (264C)<br>OFFICEMGR_EID (264D)<br>HR_EID (264E) |

USER DATA TABLES 200

FIG. 2A

APPLICATION DATA TABLES 300A

VR_DATA (320)

EID_ (324A)
TASK_ID (324B)
START_DATE (324C)
END_DATE (324D)
VAC_LENGTH (324F)
DESCRIPTION (324G)
NOTES (324H)
TYPE_DESC (324I)
FIRST_CON_EID (324J)
SECOND_CON_EID (324K)
THIRD_CON_EID (324L)

VR_CONTACT (340)

EID_ (344A)
RANK (344B)
CON_EID (344C)

FIG. 3A

| | |
|---|---|
| My Freeworks | 🛩 Travel Request |
| 0 New | |
| 0 Overdue | |

October 13, 1999      logout

| Description: | living in a small cabin, without running water | | |
|---|---|---|---|
| Requester: | XXXX@XXX.com | Request date: | 10/12/99 |
| Priority: | Normal | Status: | Done |
| Travel start: | 10/13/99 | Purpose: | regain sanity |
| Travel end: | 10/12/00 | Total travel days: | 365 |
| Destination: | | Estimated cost: | $14 |
| Note: | | | |

598

History

| Assigned to: | XXXX@XXX.com | | Status: | Reject |
|---|---|---|---|---|
| Assigned: | 10/11/99 2:20:41 PM | Viewed: 10/11/99 2:23:49 PM | Completed:10/1 | |
| Notes: | | | | |

599

Report A Bug

Get It done...
Add a To-Do
Assign an Action Item
Employee List
Expense Report
Purchase Request
Travel Request
Vacation Request

Tell a Friend

Resources
Finance
Human Resources
Legal Management
Office Management
Sales & Marketing
Vendor Management

Site
Help & Support
My Account
Logout

© 1999 BCDS, Inc.    Your Privacy | About Us | Jobs@ Freeworks.com

By accessing and using this site you agree to our Terms of Service.

FIG. 5C

METHOD AND APPARATUS FOR MAPPING A COMMUNITY THROUGH USER INTERACTIONS ON A COMPUTER NETWORK

REFERENCE TO RELATED APPLICATIONS

This application hereby claims the benefit of provisional application serial no. 60/158,314, filed Oct. 8, 1999.

FIELD OF THE INVENTION

The present invention relates to a method and apparatus for mapping the organizational structure and work flow of a community of users from a database. The invention uses an online computer applications service that facilitates the initiation and completion of transactions between users in the community in order to attract and invite users from the community onto the service and build the database. As more and more users from the community are attracted to the service and such users initiate and complete more and more transactions with each other, the database grows by storing information about each transaction between two or more users from the community. After a sufficient number of transactions are recorded in the database, the database becomes rich with information representing the organizational structure and work flow of the community, and this information can then be extracted and mapped by querying the database.

BACKGROUND OF THE INVENTION

Databases are widely used in computer applications to collect, store and retrieve user information. For example, once a user inputs user information into a particular computer application, the information can be used by the application to prefill application pages, thus streamlining the user's successive uses of the application. For example, computer applications, such as world wide web ("WWW") e-commerce applications, use databases to collect, store and retrieve a user's billing address, credit card information, and previous purchases. This information is then used to prefill web page forms upon successive uses of the WWW e-commerce applications. Other examples of such computer applications include stock tracking applications and travel reservation applications.

Existing computer applications, however, do not derive the structure of a group of people, or community, communicating over a computer network. This structural information would be quite useful in determining, analyzing, and improving how people work together. Further, these computer applications are limited in that, without an understanding of a particular community structure, they cannot predict the next step in a community procedure or derive work flow procedures and rules for a particular community.

It is therefore, an object of the present invention to provide a method for building a database that stores transaction information representative of an organizational structure of a community of users of a computer network.

It is another object of the present invention to provide a system for deriving the structure of a community whose people interact with one another on a computer network through a computer applications service.

It is another object of the present invention to provide a system for predicting the next step in a work flow process for a particular community whose people interact with one another on a computer network through a computer applications service.

It is another object of the present invention to provide a system for deriving work flow procedures and rules for a particular community whose people interact with one another on a computer network through a computer applications service.

It is another object of the present invention to provide a system for branding users of a particular community to track the identity of a third-party web site that refers or attracts each user of the community to the computer applications service.

These and other objects of the invention will become apparent from the description of the invention that follows.

SUMMARY OF THE INVENTION

The present invention is directed to a system and method for building a database that stores information representative of the organizational structure of a community of users of a computer network. In one example, the community of users corresponds to the employees of a particular business. In another example, the community of users corresponds to suppliers and customers from various businesses. The invention uses an online computer applications service that facilitates the initiation and completion of transactions (e.g., vacation requests or purchase order approvals) between users in the community (e.g., subordinates and managers in the business or between purchasers in one business and suppliers in another) over a computer network such as the internet. Initially, a first user from the community (e.g., an employee of the business) registers on the computer applications service and information representative of the first user is stored in the database. In one embodiment, the first user from the community is referred to the service via a banner advertisement or hyperlink on a third-party web-site. In another embodiment, the first user accesses the service directly through the service's universal resource locator on the world-wide-web. Next, a first transaction record is created in the database from information inputted by the first registered user. In the illustrative example, the first transaction request corresponds to a vacation request that the first registered user is making to his/her manager at the company, and the manager is not a registered user of the service when the first transaction is initiated. The first transaction record includes at least one field representing an identity of a first unregistered user (e.g., the manager that will receive and be required to approve the vacation request) in the community, a field representing a role (e.g., requester) of the first registered user in the first transaction, and a field representing a role (e.g., approver) of the first unregistered user in the first transaction.

After creation of the first transaction record, the first unregistered user (e.g., the manager) is invited to register with the service when information representative of the first transaction is sent to the first unregistered user. In other words, in the illustrative example, the manager is invited to register with the service at the time that the vacation request is sent to the manager for approval. In response to this invitation, the first unregistered user registers with the service and information representative of the first unregistered user is stored in the database, thereby transforming the first unregistered user (e.g., the manager) into a second registered user.

After registration of the second user, further users from the community (e.g., further employees of the business) are invited onto the service and registered on the database by repeating the above process. Thus, further unregistered users from the community are registered with the service by repeating the following steps: (i) creating a further transaction record in the database from information inputted by a given registered user, wherein the further transaction record includes at least one field representing an identity of a given unregistered user in the community, a field representing a role (e.g., requestor) of the given registered user in the further transaction, and a field representing a role (e.g., approver) of the given unregistered user in the further transaction, (ii) inviting the given unregistered user to register with the service by transmitting information representative of the further transaction (e.g., a vacation request or purchase order approval request) to the given unregistered user over the computer network (e.g., the internet), and (iii) registering the given unregistered user with the service in response to the invitation, by storing information representative of the given unregistered user in the database, thereby transforming the given unregistered user into a registered user. There can be numerous transactions that involve a non-registered user, prior to registration of that non-registered user.

In addition, as the database of the present invention is being constructed through transactions between registered and unregistered users resulting in further registration of users from the community with the service, the present invention also preferably stores information about the organizational relationships of existing users, whether registered or unregistered, by facilitating the initiation and completion of transactions between such users. Thus, further information representative of the organizational structure of the community of users is stored by repetition of the following step: creating a still further transaction record in the database from information inputted by a registered user initiating the still further transaction, wherein the still further transaction record includes at least one field representing an identity of a user, whether registered or unregistered, in the community required to approve the still further transaction, a field representing a role (e.g., requester) of the registered user initiating the still further transaction in the still further transaction, and a field representing a role (e.g., approver) of the user, whether registered or unregistered, in the still further transaction.

In accordance with a further aspect of the present invention, after the database is built using the methods described above, the database is queried in order to derive or map the organizational structure of the community of users. Thus, in the illustrative example, the transaction records corresponding to the transaction requests (e.g., the vacation requests and the purchase order requests) made by the employees of the business using the service are searched and processed in order to derive the organization structure of the business. This aspect of the invention makes certain assumptions such as, for example, that a person making a vacation request is lower on the reporting structure of a company than the person approving the request. It is noted, however, that such assumptions may be changed in the present invention. Using such assumptions and the "role" information stored in the transaction records, the present invention maps the organization structure of the users in the community (e.g., the reporting structure of the employees in the business). In addition, the present invention uses data base query techniques known in the art to query the information stored in the transaction records to map the work flow structure of the users in the community.

In accordance with a still further aspect, the present invention is able to predict the recipient or approver of certain transactions at the time that such transactions are being authored using information stored in the database from past transactions involving users in the same community. Thus, for example, if an employee from the company is authoring a vacation request, the system uses the information stored in the database to predict the person that should receive the request for approval. In a particularly preferred aspect, where a particular user making a vacation request has, for example, not made a previous vacation request, the present invention predicts the identity of the user, whether registered or unregistered, in the community required to approve the vacation request by querying the database to identify a peer of the user making the vacation request, and then selecting a manager of the peer as the user, whether registered or unregistered, in the community required to approve request. The present invention then populates the approver field of the vacation request at the time that it is being created with the predicted approver.

In accordance with a still further aspect of the present invention, the method for building a database that stores information representative of an organizational structure of a community of users of a computer network includes the steps of storing information representative of a first user from the community in the database, wherein a computer applications service records initiation and completion of transactions between users in the community, creating a first transaction record in the database from information inputted by the first user, wherein the first transaction record includes at least one field representing an identity of a second user in the community, a field representing a role of the first user in the first transaction, and a field representing a role of the second user in the first transaction, transmitting information representative of the first transaction to the second user, and storing further information representative of the organizational structure of the community of users by creating a further transaction record in the database from information inputted by a user initiating the further transaction, wherein the further transaction record includes at least one field representing an identity of a user in the community required to act on the further transaction, a field representing a role of the user initiating the further transaction in the further transaction, and a field representing a role of the user acting on the further transaction in the further transaction, and repeating the additions to the further transactions record as new transactions occur.

BRIEF DESCRIPTION OF THE DRAWINGS

The features, objects and advantages of the present invention will become more apparent from the detailed description set forth below when taken in conjunction with the drawings in which like reference characters identify corresponding elements and wherein:

FIG. 1B illustrates an exemplary invitation email sent in the present invention;

FIG. 1C illustrates an exemplary display of a blank request for action for use in the present invention;

FIG. 1D illustrates an exemplary display of a blank vacation request for use in the present invention;

FIG. 1F illustrates an exemplary display of a blank purchase request for use in the present invention;

FIG. 1G illustrates an exemplary display of a blank expense report for use in the present invention;

FIG. 1I illustrates another embodiment of an exemplary display of the menus of the present invention;

FIG. 1J illustrates an exemplary display of a completed transaction in the present invention;

FIG. 2A illustrates the structures of four tables that are used in the database of the present invention to store information about each user in a community;

FIG. 3A illustrates the structure of two tables that are used in the database of the present invention to store information about a particular type of transaction (i.e., a vacation request) between users in the community;

FIG. 5C illustrates an exemplary travel request transacted using the present invention;

DETAILED DESCRIPTION OF THE PREFERRED EMBODIMENT

It is to be understood that the figures and descriptions of the present invention have been simplified to illustrate elements that are relevant for a clear understanding of the present invention, while eliminating, for purposes of clarity, many other elements found in a typical database system. Those of ordinary skill in the art will recognize other elements which are necessary and/or desirable for implementing the present invention. However, because such elements are well known in the art, and because they do not facilitate a better understanding of the present invention, a discussion of such elements is not provided herein.

Figure 1A:
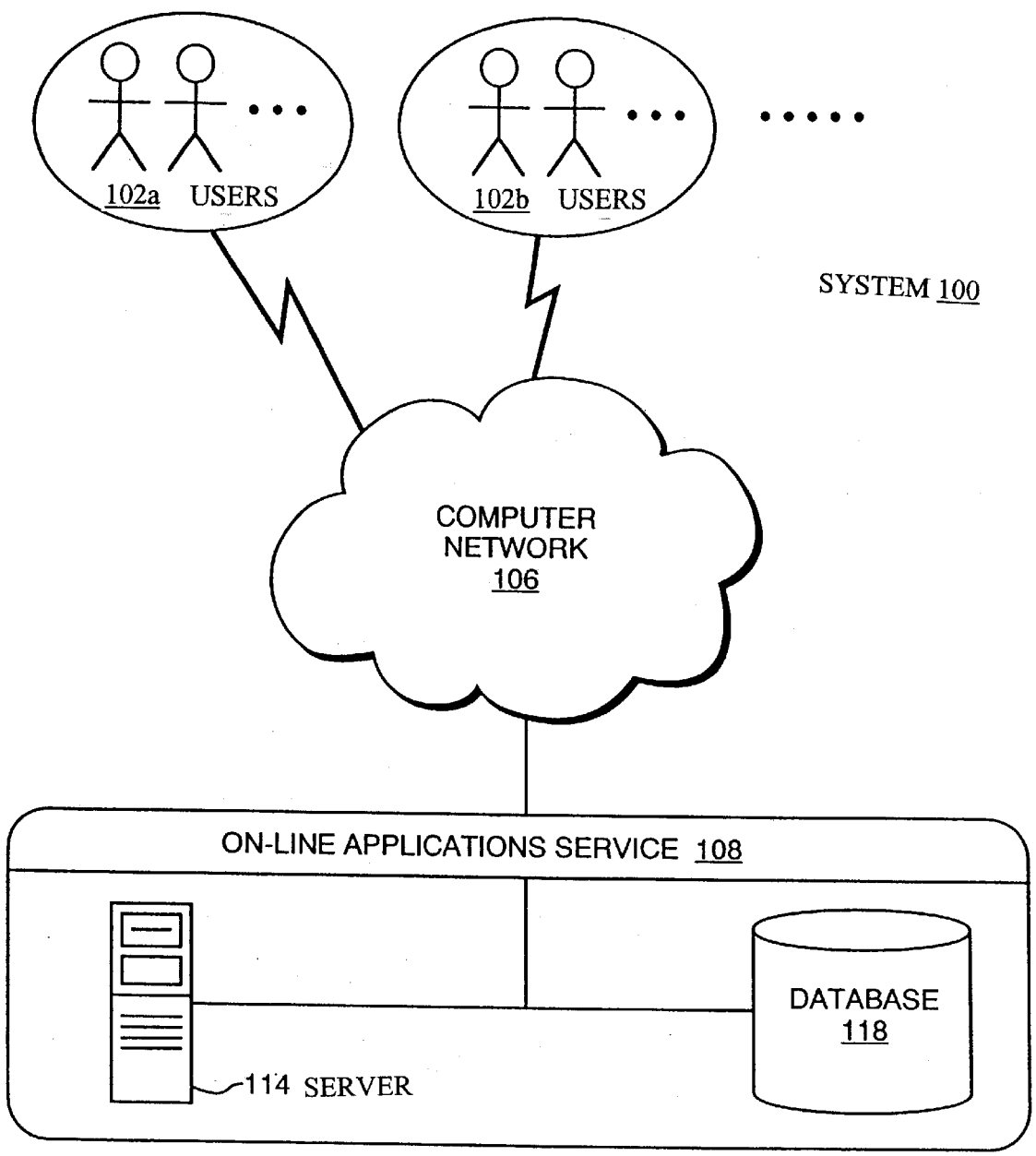
FIG. 1A is a block diagram showing the components of a system for deriving or mapping the organizational structure and work flow of a community of users, in accordance with a preferred embodiment of the present invention.
Figure 2B:
FIG. 2B illustrates an account summary for use with the present invention.

Referring now to FIG. 1A, there is shown a block diagram illustrating the components of a system 100 for mapping the organizational structure and work flow of a community of users, in accordance with a preferred embodiment of the present invention. In system 100, various communities of users 102a, 102b, . . . are coupled to on-line applications service 108 via computer network 106 (e.g., the internet). In one embodiment, on-line applications service 108 is implemented as a site on the internet. Each user from one of the communities communicates with applications service 108 using a personal computer or workstation (not shown) coupled to network 106, but the users could also access the system from other devices such as voice response systems and personal digital assistants. The on-line applications service 108 includes at least one server 114 that includes software for implementing the methods discussed herein, including the procedures shown in FIGS. 5–9. In addition, the on-line applications service 108 includes at least one database 118 that stores the information discussed herein, including the information represented by the tables shown in FIGS. 2–4 herein.

Each community 102a, 102b, . . . is a group of two or more people who are connected through a computer network 106, and who would have a need or desire to interact in order to complete transactions. A single user may be a member of multiple communities 102a, 102b . . . , and will maintain the same identification across all communities. The computer network 106 may be, for example, the Internet, a commercial network, an intranet, a local area network, or a wide area network. An example of a community is a group of users that interact with one another in connection with the operation of a given business or industry. This community of users might include, for example, employees of the given business, as well as contractors, subcontractors, consultants, vendors, suppliers or customers of the business. In this example, some of the transactions that the persons in the community might initiate with each other would include, for example, a vacation request that one employee makes to his/her supervisor, a purchase order request that an employee makes to his/her supervisor, electronic submission of an invoice for payment from an outside consultant or vendor to an employee of the company, a time card submission from an employee of the company to another employee in the company's accounting department, etc. It will be understood by those skilled in the art that many other types of transactions other than those just enumerated may be performed between users in a community, and the list enumerated above should therefore be considered only illustrative and not limiting with respect to the scope of the present invention. In addition, it will be understood by those skilled in the art that a business is only one type of community to which the present invention may be applied, and that there are numerous other types of communities to which the present invention may be applied, such as workgroups within a company or workgroups between companies.

A person in a community 102 may be referred to as a user, and the number of users making up a given community can change at any time. Each user in a given community will either be registered or unregistered with the computer applications service 108 at any given time. Initially, only one user from a given community will typically be registered with service 108. An unregistered user from the community will typically become a registered user when the unregistered user responds to an invitation from a registered user. This invitation comes in the form of the registered user naming the unregistered user as the second necessary party in a transaction (e.g., when the registered user makes a vacation request to the unregistered user). For example, when an unregistered user is invited, that invitee may receive email inviting him to register, such as the email shown in FIG. 1B. Once the user responded to the invitation by registering, he would have the option to accept or reject the requested transaction. As explained more fully below, the present invention then uses further transactions initiated by registered users in the community to invite further users from the community to service 108. As such, further users are invited onto the service, and typically register with the service, thereby increasing the number of users from the community that are registered with the service.

The computer applications service 108 of FIG. 1A provides at least one software application for use by a registered user from a community. For example, a software application may include a program that the registered user can run on service 108 in order to generate, for example, a vacation request or purchasing request to be submitted to a superior, a time card to be submitted to a company's accounting department, or a meeting scheduling request to be submitted to a co-worker. Alternatively, the request may be for any generic action by a third party as requested by the user. Until a request is completed, the request may be presented as a blank form or a prefilled form in an html language, such as those shown in FIGS. 1C (Action Item Request), 1D (Vacation Request), 1E (Travel Request), 1F (Purchase Request), and 1G (Expense Report). Each such vacation or purchasing request, time card submission, meeting request, etc., is referred to herein as a transaction or a transaction request. These forms may include tracking numbers, such as that shown in FIG. 1G, to aid in the tracking of a transaction. It will be understood by those skilled in the art that many transactions (other than those enumerated herein) may be implemented using the present invention.

Figure 1E:
FIG. 1E illustrates an exemplary display of a blank travel request for use in the present invention.
Figure 1F:
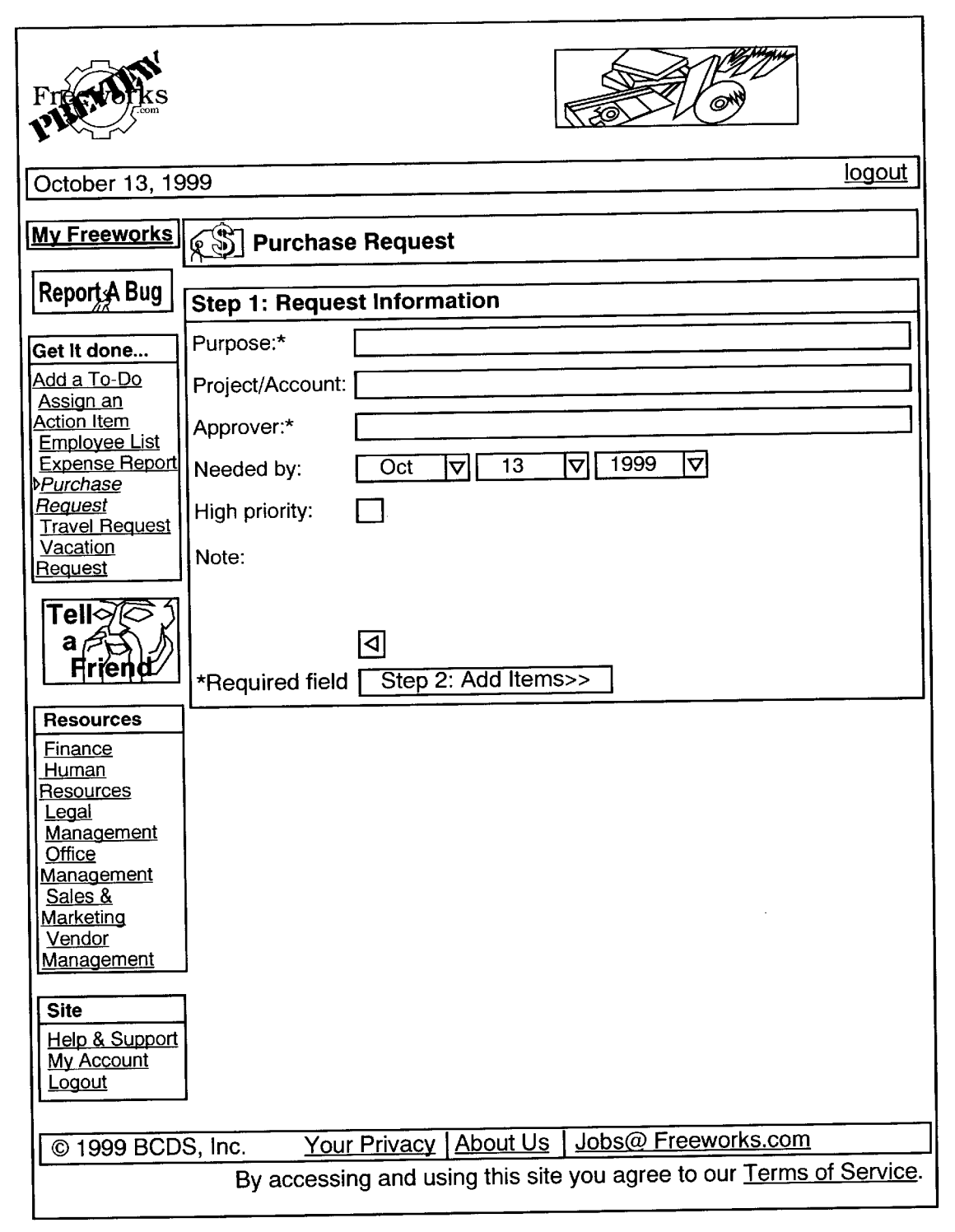
Figure 1G:
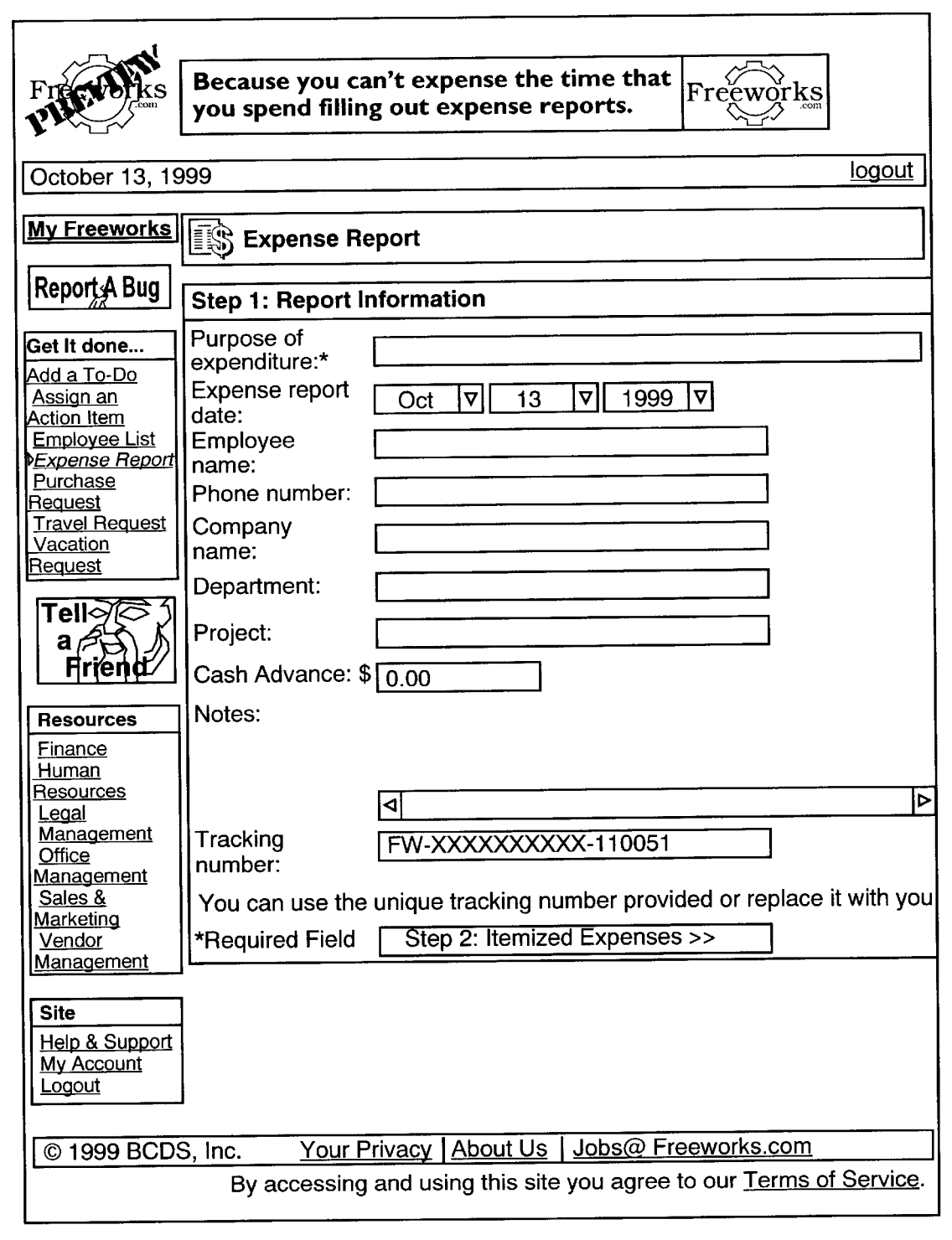
Figure 1H:
FIG. 1H illustrates an exemplary display of the menus of the present invention.

The present invention may additionally allow a registered user to track the progress of past, pending, or current transactions. For example, as is illustrated in FIGS. 1H and 1I, the user can track "Action Items", which are then-current transactions (see FIG. 1H), "Items Waiting On", which are items that have invited a response from a third party, which response is then-pending, or "Completed Items", which includes completed transactions both by and for the user (see FIG. 1I). The item may be completed by a rejection by an approver of a request, such as a purchase request, or by the user. When the status of such a completed transaction is tracked by selecting the transaction in FIG. 1I, the specifics of the transaction may be displayed to the user, as is shown in FIG. 1J. This display would be the same, after selection from the "Completed Items" menu, for both the requester and the approver from within the respective accounts.

Figure 3B:
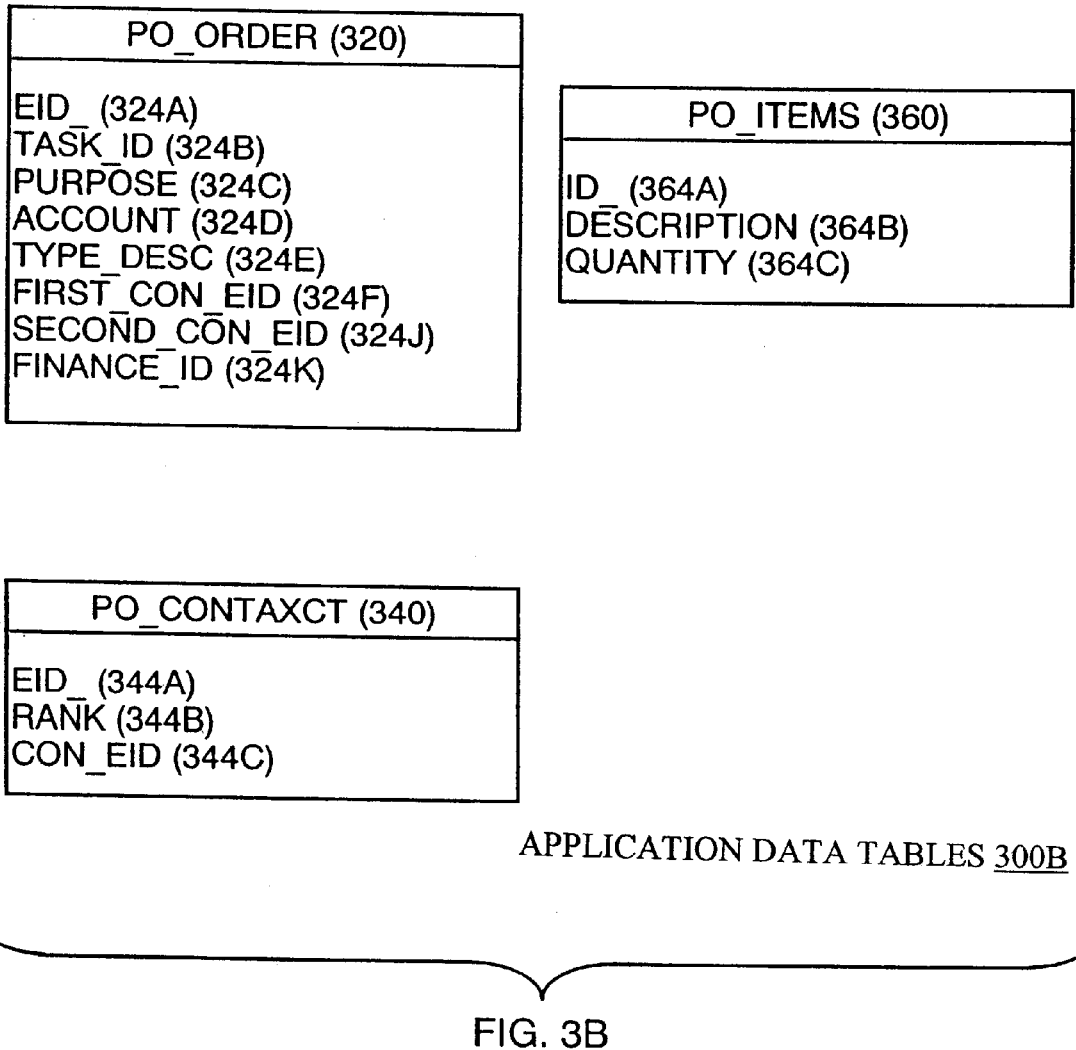
FIG. 3B illustrates the structure of two tables that are used in the database of the present invention to store information about a further particular type of transaction (i.e., a purchase order request) between users in the community.
Figure 4:
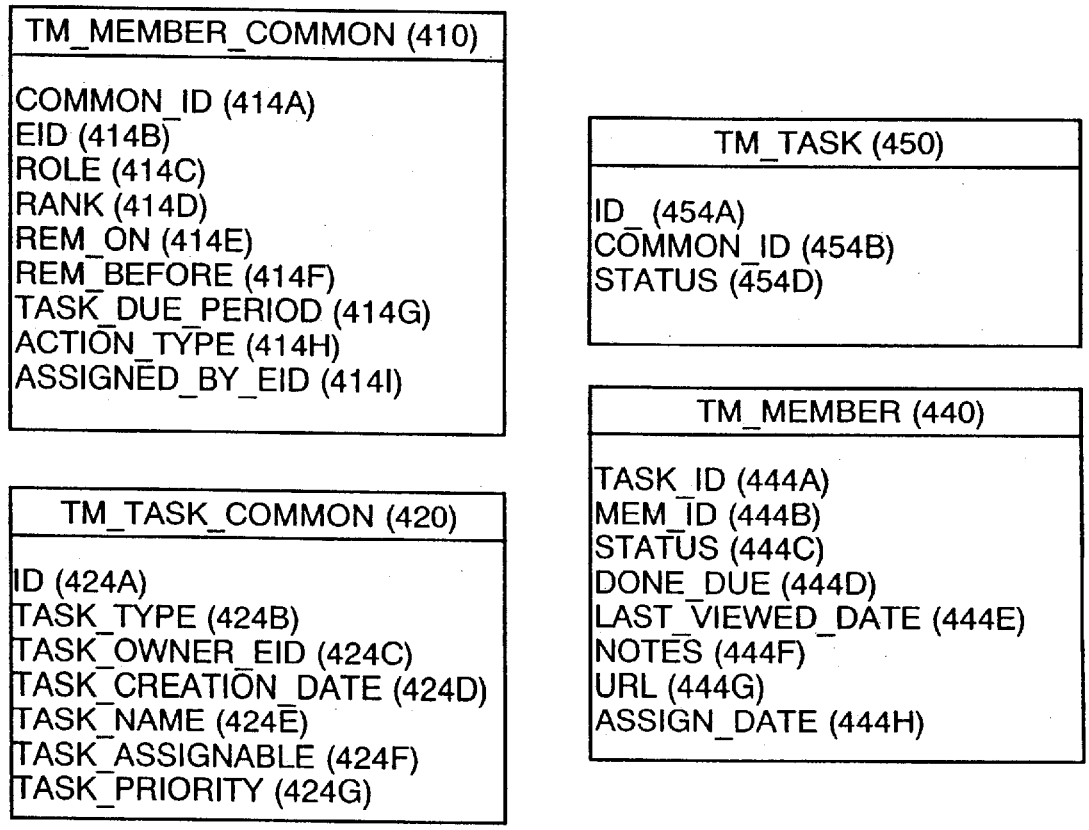
FIG. 4 illustrates the structure of four tables that are used in the database of the present invention to store transaction records representing each transaction that is initiated by a user in a community.

FIGS. 2–4 are block representations illustrating database 118 as a database having several data tables, such as user data tables 200, application data tables 300A amd 300B, and application task manager data tables 400. Referring specifically to FIG. 2, there is shown the structures of four tables that are used in the database of the present invention to store information about each user in a community. Entity table 250 stores a unique record (formed of fields 254A and 254D) for each user in a community. In particular, the present invention stores a unique identifier, such as a Universally Unique Identification ("UUID") in field 254A for each user that registers or is invited to register on service 108. Field 254D contains an owner identification value, which is typically set to 0 at the time that the entity identification is created.

Each field in relationship table 260 includes information representing a snapshot of the last transaction authored by that user of the service that referenced that particular role. Thus, for example, if the last transaction requested by a given user was a vacation request that the given user made to his/her superior, the present invention assumes that the person to whom the vacation was sent was the given user's manager, and the identity of this person is stored in manager_id field 264B. In addition, to the extent that the previous transaction authored by the given user involved an accounting reference (e.g., if the last transaction was a timecard submission made by the given user to an employee in the company's accounting department), the identity of that accounting reference is stored in accounting_id field 264C. Similarly, to the extent that the user's previous transaction involved an office manager or a human resource director, the identity of such persons will be stored in fields 264D and 264E. A previous relation snapshot will exist only where the given user is a previously registered user of service 108. The other user (e.g. manager, accounting employee, office manager, or human resource director) in the relation snapshot may be registered or unregistered. Numerous role fields other than those shown may be present, such as that user's CEO, lawyer, doctor, or broker.

An entry in the E_contact table 230 is created for each user at the time that a user registers with service 108. However, the fields in table 230 are not filled in at the time of registration. Rather, the fields on this table are filled using information that the user inputs into the system in connection with the authoring of transactions by the user. The fields in table 230 in essence store contact information such as the home and work addresses, phone numbers and fax numbers of a given user. Such information may be stored in an account summary accessible to the user, and available to the user at all times during a logged in session, such as the account summary shown as FIG. 2B. Such account summary information is preferably variable by the user at any time, and may include general personal information, password information, email options, and access to the history of the account. As the fields of table 230 in FIG. 2A become populated through the use of the service by a given user, service 108 automatically retrieves previously stored information from table 230 during the authoring of a transaction and automatically places such information into the transaction request so that the user does not have to re-enter information (such as the user's address, etc.) when authoring subsequent transactions.

An entry in E-Security table 240 is created (if it does not already exist because the user was previously invited) and all fields in each such entry are filled in when a user registers with service 108. These fields relate to the user security status. Exemplary fields include an e_status_id field 244D which indicates whether the user is registered, invited, or disabled (an entry in entity table 250 is created for an invited user at the time that the user is invited to service 108, and various fields in the table are then filled in for the invitee at registration), fields confirming verification of the user's email address (fields 244E and 244G), and a field representing the number of registered users that resulted from direct invitations made by the user (field 244K). Fields 244J, 244M, 244N, and 244O store information relating to the lineage of a particular user (i.e., the chain of prior registered users through which the user was invited onto service 108). A first user would receive a level 0 at step 244J, signifying that the first user was not invited. Subsequent users would receive incremental numbers assigned at 244J. For example, the first invited user would receive a 1 at 244J, the first invited user would then invite a second, who would receive a 2 at step 244J, and so on. Step 244M maintains a record of common lineage of the first and subsequent invited users. For example, a code would be assigned at step 244M which would signify the lineage of a common referring site identification. Each subsequent invitee would then share the same value in field 244M. Fields 244N, and 244O maintain a record of the total numbers of users invited and registered in a particular lineage signified by 244M.

Referring now to FIG. 3A, there is shown the structure of two tables that are used in database 118 to store information about a particular type of transaction (i.e., a vacation request) between users in the community. FIG. 3A is exemplary only, and is not limited to the specific fields or application shown. In FIG. 3A, an entry is created in table 320 for each vacation request authored by a user on service 108. Each entry in table 320 includes a field 324A that identifies the user that is authoring the transaction, and a field 324B that identifies a task identification number associated with the transaction (this field is discussed further in connection with table 440 below). In the vacation request example, field 324F is the vacation length requested in days. In an alternative embodiment, the form may be, but is not limited to, a purchase order request, such as that shown in FIG. 3B. Fields 324J, 324K and 324L represent other users in the community that will be involved in the particular transaction, in this case the vacation request. These fields will, for example, hold the identification numbers of the users in the community that must approve the vacation request. For some vacation requests, such as those that are particularly long, a chain of persons may be required to approve the request. The approval chain is involved where multiple superior parties to a user must assent to an action, and those assents are to be obtained in a prioritized order (President, Vice President, Treasurer, for example). For each such approver in the chain, there is a separate entry in VR_Contact table 340 which, among other things, stores the rank in the approval chain of each such person for the given transaction.

Referring now to FIG. 4, there is shown the structure of four tables that are used in database 118 to store transaction records representing each transaction that is initiated by a user. For each transaction authored by a given user, a single entry is created in tm_task table 450 and an entry is created in tm_task_common on table 420. Each transaction will typically involve the user authoring the transaction and one or more other users. Each of these persons is referred to as a "member" of the transaction. For any given transaction, a separate entry is created in tm_member_common table 410 for each member of the transaction. Similarly, for any given transaction, a separate entry is created in tm_member table 440 for each member of the transaction.

In table 450, the task identification field 454A holds the same value as was stored in field 324B (discussed above). Field 454D is used to store the status of the transaction and will typically have a value corresponding to "completed" or "in-progress."

In table 420, the task identification field 424A holds the same value as was stored in field 324B (discussed above). Field 424B stores a value representing the specific type of transaction being created, e.g., a vacation request, a purchase order request, a time card submission, etc.

As mentioned above, an entry is created in table 410 for each member of each transaction. Thus, for a given transaction, there will be multiple entries in table 410. Field 414A contains a common_id value that is unique to each transaction and is also stored in field 454B. Field 414B contains the user identification of a given member of the transaction. Field 414C defines role of a given member in the transaction. For example, this field will have a value corresponding to an approver, a manager, or a delegate, etc. The rank of the given user in the approval chain is stored in field 414D. Field 414D thus provides a ranking system in which the requester, a registered user, would receive a rank of 0. The approver would then receive a rank of 1, a superior approver a rank of 2, and so on. Step 414H stores information on whether the request needs to be approved, rejected, or delegated. The rank of the user together with the identification of that user, provides a unique key combination, because one user can have multiple roles in the same transaction. Fields 414E and 414F are used to store information for providing reminders if desired and, if so, on what date. Although fields 414E and 414F are filled by the requestor of the vacation, these fields can later be modified by the receiver of the request.

Table 440 contains companion entries to those in table 410. Table 440 contains information on whether the task is done, and includes the assignment of a unique URL to each task member, as discussed above.

Figure 5A:
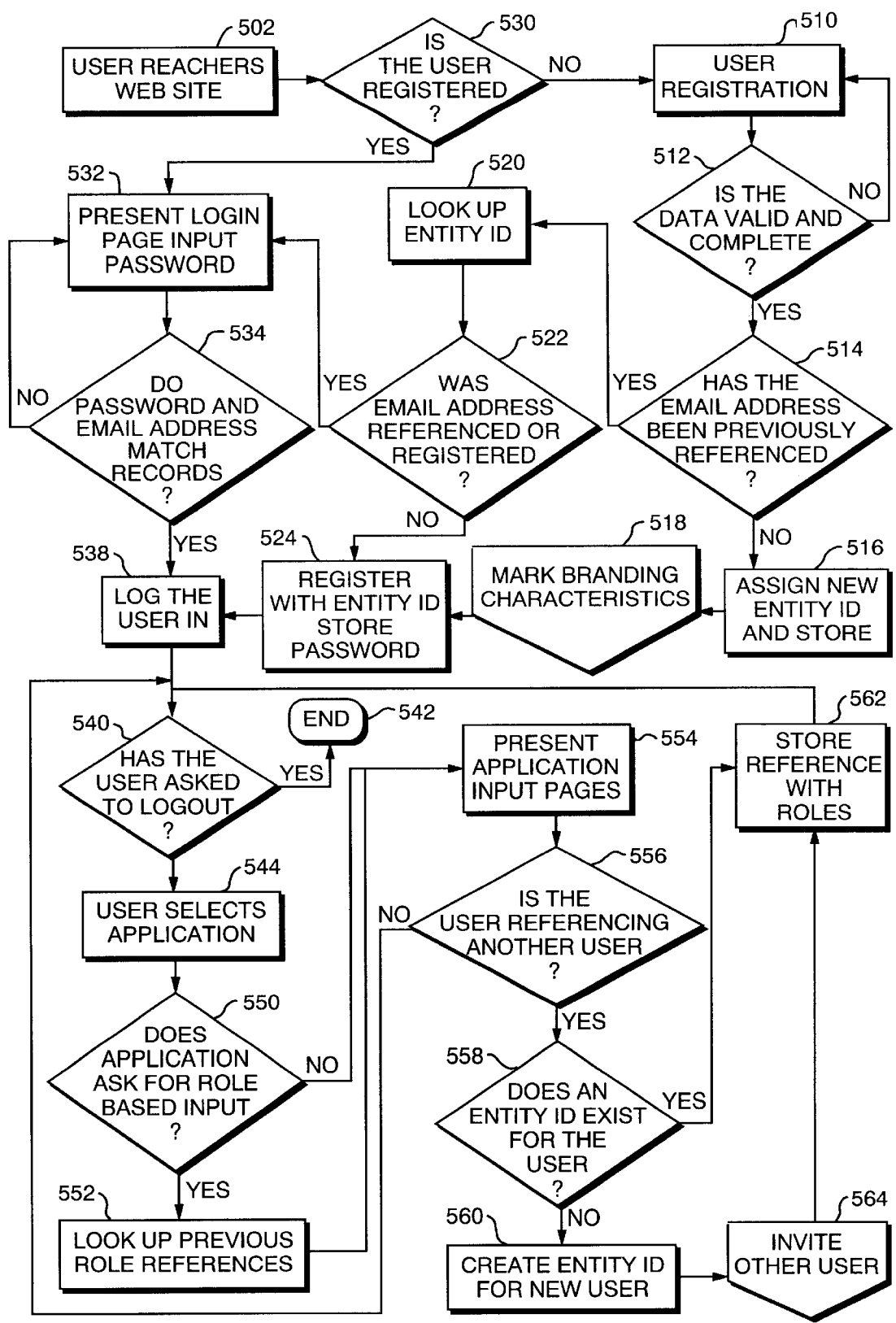
FIG. 5A is a flow chart of a system for registering a user on the applications service of the present invention, and for initiating a transaction authored by the user using the applications service of the present invention.
Figure 5B:
FIG. 5B illustrates an exemplary display of a user registration form for use in the present invention.

Referring now to FIG. 5A, there is shown a flow chart of a system for registering a user on the applications service of the present invention, and for initiating a transaction authored by the registered user using the applications service of the present invention. A user reaches the service site 108 at step 502. Where network 106 is the internet (rather than an ERP operating within an organization), the user accesses the computer applications service 108 by inputting a universal resource identifier ("URI"), such as a universal resource locator ("URL"), of the computer applications service 108, or by clicking a hyperlink that takes the user to site 108. Steps 510 through 538 illustrate a user login procedure, whereby a user identification is assigned or recognized. If the user has not previously registered with the service at step 530, the user is directed to registration at step 510. At registration, the user may be presented with an interactive display requesting necessary registration information, such as the display shown in FIG. 5A, for example. If the user has previously registered, the user is directed to step 532, discussed below. If the user is unregistered at step 530, the user then inputs unique user data, as discussed above with respect to FIG. 2, at step 512. If the user data is not valid or complete (step 512), as determined by field E_Mail 244C (a flag in this field is set if the service was unsuccessful in verifying the user's email address), the user is sent back to the user registration at step 510 to repeat step 510. If the e-mail address is secure (i.e. verified), but was not previously inputted to Security data table 240, field E_Mail 244C, a new user identification number is issued to the user and stored at step 516, and the user is now registered.

Figure 6:
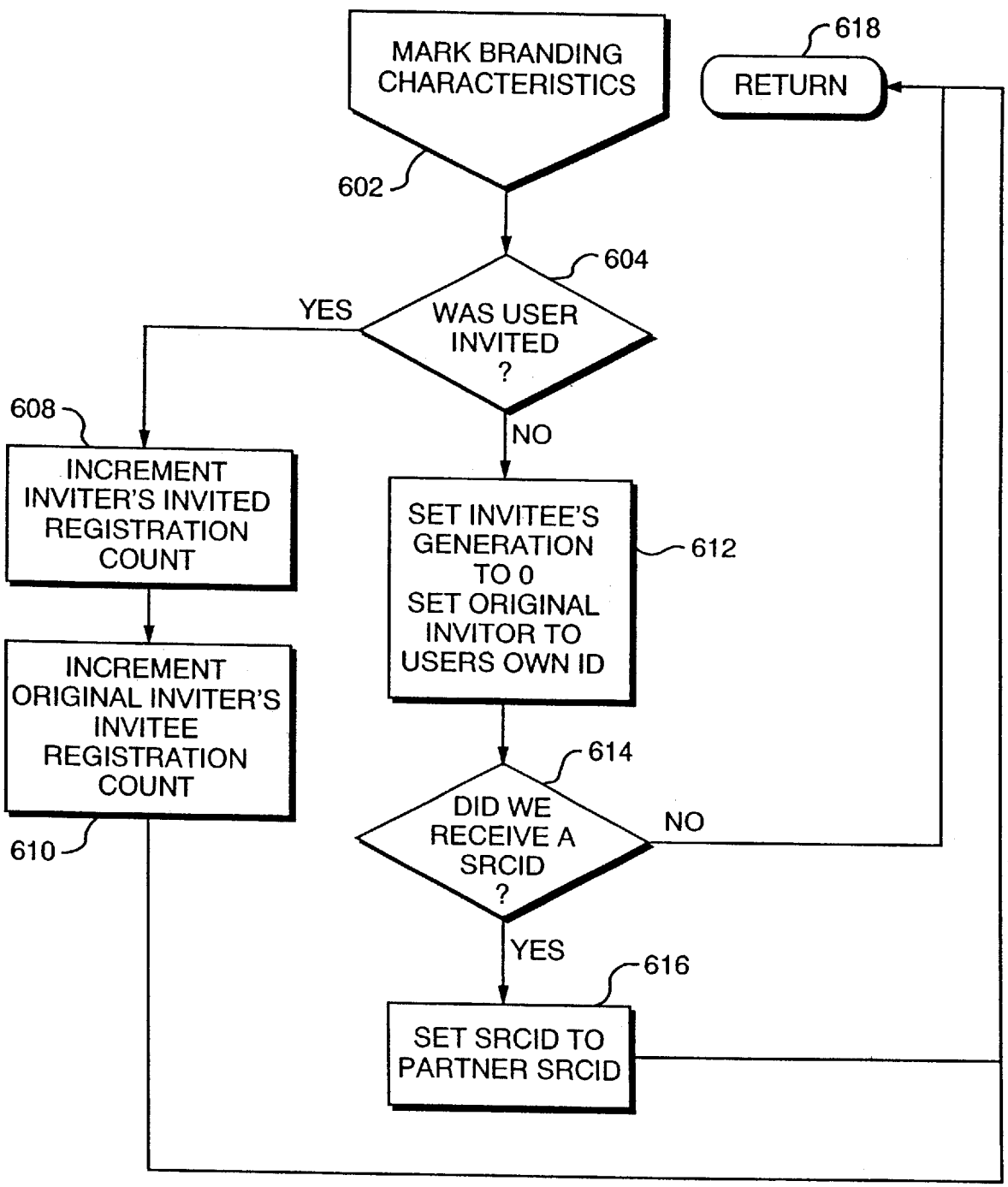
FIG. 6 is a flow chart of a system for tracking the identity of a third-party web site that referred or attracted the first user of a community to the applications service of the present invention.

Once a new user identification is assigned at step 516, the user is "branded" at step 518 (see step 602 of FIG. 6). The purpose of branding is to track the original source, lineage and generation of the user. Branding confirms the status of a user as inviter or invitee, and is discussed in detail with respect to FIG. 6. After branding, the user returns to the registration process at step 524. The user registers at step 524 by selecting and confirming a password. The user is then logged into the computer applications service 108 at step 538.

Alternatively, if the user's e-mail address had been previously stored in Security data table 240 at step 514, the identity for the user is looked up in table 250 at step 520. If, at step 522, the identification for the user indicates the user did not previously register with the computer applications service 108, the user is then requested at step 524 to select and confirm a password, thus becoming registered.

If, at step 522, the identification for the user indicates that the user previously registered with the computer applications service 108, the user is presented with a login page at step 532 which requests the user's password. Alternatively, step 532 is reached directly if the user was registered at step 530. If, at step 534, the password and e-mail address inputted by the user correspond to the e-mail address and password for the user's identification in the table 240, then the user is logged in at step 538. If, however, at step 534, the password and e-mail address inputted by the user do not correspond to the e-mail address and password for the user's identification in the data table 240, the login page is presented again to the user, and the user returns to step 532.

If the user at step 530 indicates he is a previously registered user, the user is presented with the login page at step 532 which requests the user's password. When, at step 534, the password and e-mail address inputted by the user correspond to the e-mail address and password for the user's identification in the Security data table 240, the user is logged in at step 538.

After the user is logged in at step 538, the user may ask to log out at step 540, or the user may select a desired application from a list of offered applications at step 544. The list of offered applications may be displayed in the form of a menu, such as that shown along the left side of FIG. 5B. For example, in the vacation request application, as represented in FIGS. 3A and 4, an "approver" of the vacation request is a required role reference, and the assigned role is that of an approver. If the application requires a role reference at step 550 of FIG. 5, previous role references inputted by the user in previous transactions are looked up at step 552 in the data table 260. In the vacation request application example, the user's data table 260 is reviewed for a previous "approver," and, if one is found, the approver's e-mail address is pre-filled in the current application at step 544. This is shown in the pre-filled "Approver" field of FIGS. 1D and 1E. If no approver is found, the identity of the approver is predicted by querying the database to identify a peer of the registered user, and the approver of the peer is then selected as the approver of the registered user. These steps 550, 552, and 544 predict the next step in the use of the application. For example, the next step in a vacation request is to send it to the approver as designated by the user in a previous transaction. If the application does not require a role reference at step 550, the application is presented at step 554 without any pre-filled information.

At step 556, the selected application determines whether the user has referenced another user by reviewing the referenced user's e-mail address. If another user has been referenced at step 556, then the application determines at step 558 whether an identification exists for the referenced user by looking in data table 250. If no identification exists for the referenced user, a new identification is assigned to the referenced user in step 560. A referenced user is a non-registered user having an identification, which non-registered user is referenced by a registered user in a selected application. The non-registered user then has the status of an invitee. An invitee can use the computer application service 108 once the invitee registers. By referencing a non-registered user in an application, a registered user becomes an inviter, and invites the non-registered user to register, as discussed with respect to FIG. 7. After the referenced user has been invited at step 564, or an identification already exists for the referenced user at step 558, then the identification for the referenced user, and the user's role reference, are stored at step 562. The process of FIG. 5 ends at step 564 with the transmission of a completed transaction request (e.g. a vacation request) from the user authoring the request to the identified approver, such as that shown in box 598 of FIG. 5C. Upon receipt of the vacation request, the identified approver will be invited to register with the service 108 (if the approver was not previously registered), as more fully discussed below with respect to FIG. 7, and may approve the request, or reject the request, as shown in box 599 of FIG. 5C. The user may then log out at step 540 of FIG. 5 and exit at step 542, or continue with another application by returning to step 544.

Referring now to FIG. 6, there is shown a flow chart of a system for tracking the identity of each third-party web site that refers or attracts a user from a community to the applications service of the present invention. This process is branding, and is referenced above with respect to FIG. 5A, occurring at step 518 of FIG. 5. Branding is the process whereby a source identification ("SRCID") is assigned to a user, whether registered or non-registered, when the user is sent to the computer applications service 108 either from a third-party web site or by another registered user who was previously branded using the invitation process discussed above. The purpose of branding is to track the original source, lineage and generation of the user.

The user enters the branding process at step 602, from step 518 of FIG. 5A. The user's data in the E_Invited_By 244H field of the Security data table 240 is reviewed at step 604 to determine whether the user was invited by a registered user to register with the computer applications service 108. If the user was not invited to the service 108 by another registered user, this means that the user was referred by a third-party web site. In that case, the system checks (at step 614) the information received from the referring web site to determine whether the referring web site is a partner of the service 108. If so, the SCRID field 244M for the user is set to a value that corresponds to the identity of the referring partner in step 616. In addition, the E_Number_Invited 244I and E_Organic_total_invited 244N fields for the user are initialized to zero. Field 244I is then incremented for a given user as each successive new user is directly invited to service 108 by that given user. Field 244N is incremented for a given user each time a new user is invited to service 108, either directly by the given user, or indirectly through another user having an invitation lineage that traces back to the given user. Alternatively, if the user was invited by another registered user to register, the inviter's invited registrations count (E_Number_Invited 244I) is incremented by 1, at step 608. In addition, the SCRID field 244M of the user is set to the value stored in the SCRID field 244M of the user's inviter. The first registered user along the then-current lineage, who is the original inviter along that lineage, has the original inviter's count incremented by 1 in the inviter's field E_Organic_Total_Invited 244N, at step 610. Further, each user along the lineage will also have their respective field E_Organic_Total_Invited 244N incremented by 1 at step 610. The user then returns to the registration process at step 524 in FIG. 5A.

If, at step 604, a given user was not invited to register, the given user's generation (stored in E_Invitation_Level 244J field) is set to zero and the E_Original_Invitor 244L field for the given user is filled with the identification number of the given user, at step 612. If an SRCID was received for the user at step 614, then the user's SRCID is set to the third party web site's SRCID at field SRCID 244M in the E_Security data table 240 at step 616. The user then continues with the registration process at step 524 of FIG. 5A. If an SRCID was not received for the user at step 714, the user continues with the registration process at step 524 of FIG. 5A.

Figure 7:
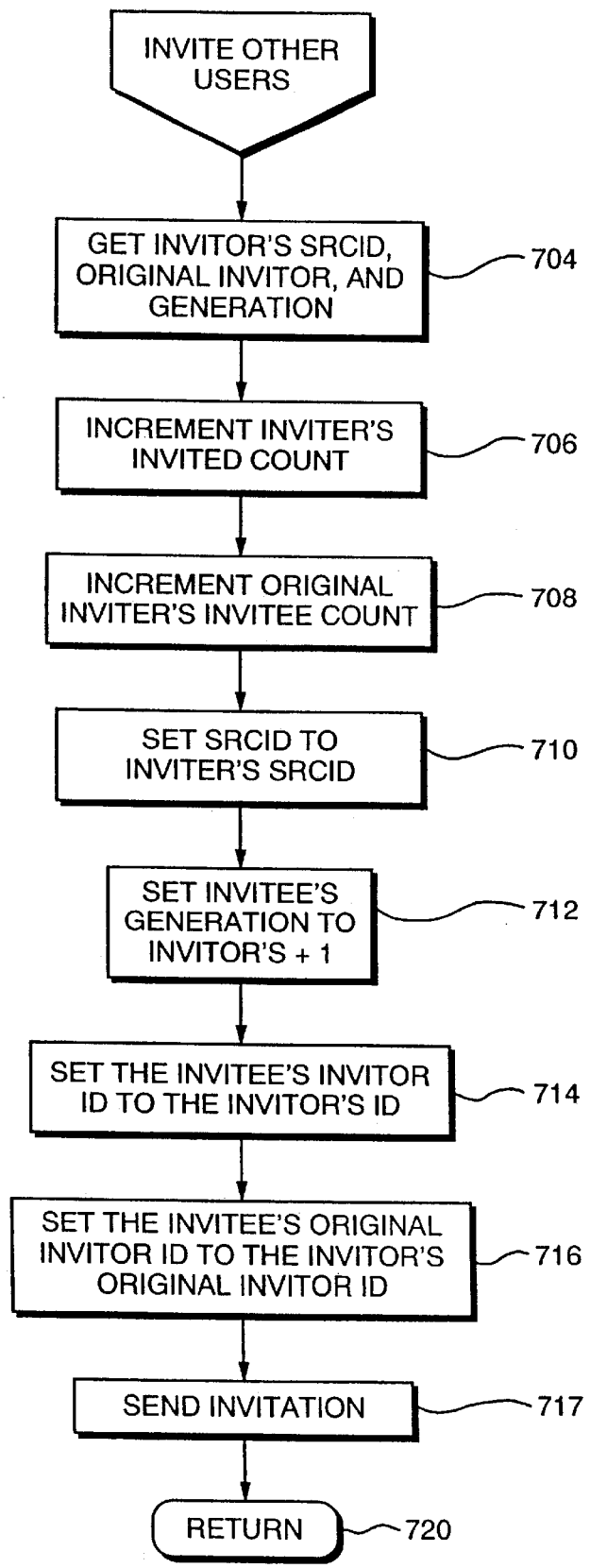
FIG. 7 is a flow chart showing how entries in the E_Security table (shown in FIG. 2A) are updated for previously registered users in the community when a new user from the community registers on the online applications service of the present invention.

Referring now to FIG. 7, there is shown a flow chart illustrating how entries in the E_Security table (shown in FIG. 2A) are updated for previously registered users in the community when a new user from the community registers on the online applications service of the present invention. After a new identification is assigned to the referenced user at step 560 in FIG. 5A, the data for registered user's SRCID, original inviter, and generation are obtained from the registered user's E_Security data table 240, at step 704. At step 706, the registered user's invited count is incremented by 1 in field E_Number_Invited 244I. At step 708, the original inviter's invitee count is incremented by 1 in field E_Organic_Total_Invited 244N, as discussed above with respect to FIG. 6. The invitee's SRCID is then set to the inviter's SRCID at step 710 and the invitee's rank is set to the inviter's generation plus 1, at step 712. At step 714, the invitee's inviter identification is set to the inviter's identification. At step 716, the invitee's original inviter identification is set to the inviter's original inviter identification. The invitee is then sent an invitation by e-mail to register with the computer applications service 108. The inviter is then returned to the registration process at step 718, at step 562 of FIG. 5A.

Figure 8:
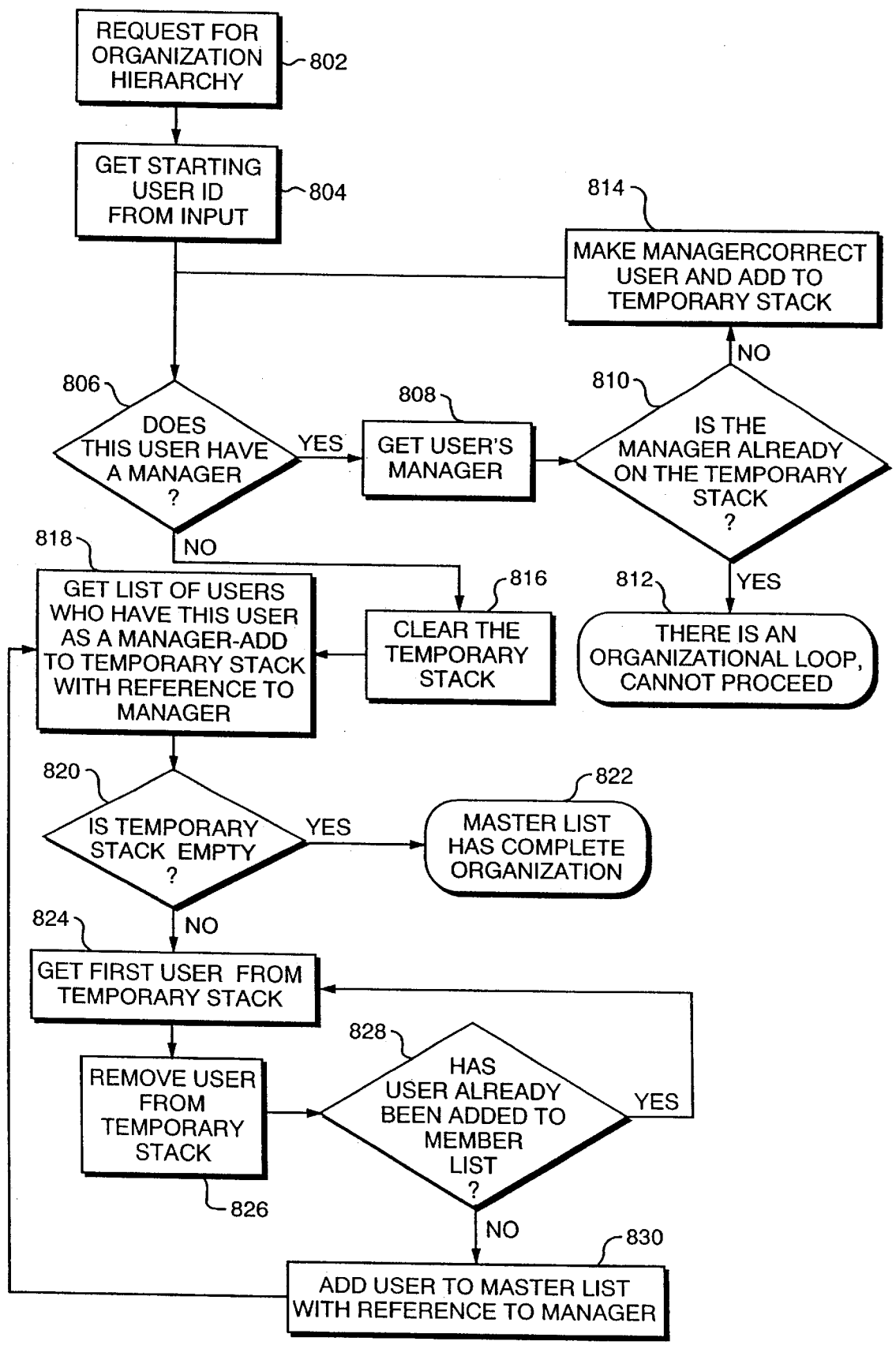
FIG. 8 is a flow chart of a system for querying the database of the present invention in order to derive a map of the organizational structure of the community (i.e., to map the relative hierarchy between the users of a community)

Referring now to FIG. 8, there is shown a flow chart of a system for querying the database of the present invention in order to derive a map of the organizational structure of the community (i.e., to map the relative hierarchy between the users of a community). The query is issued at step 802, as a request for the organizational hierarchy. At step 804, the starting user identification is inputted. The starting user identification is the user around whom the organizational hierarchy is to be obtained by the query. At step 806, it is decided whether the inputted user has a manager, by checking for an entry in field 260. If field 260 is populated, the user's manager is loaded at step 808, and, if the manager is not already on the stack at step 810, the manager is added to the stack at step 814, and the query returns to step 806. The manager then becomes the current user at step 806. If the manager is already on the stack, then the identified manager is both a superior and subordinate of the named user, and an organizational loop error has occurred. This causes a cessation of the query at step 812.

If the current inputted user does not have a manager at step 806, the current user is the top level manager, and the temporary stack is cleared at step 816. A listing is then generated of users who are managed by the current inputted user at step 818, and those users are added to the temporary stack. If the temporary stack is empty at step 820, then the Master List of the complete organization has been generated at step 822.

If the temporary stack is not empty at step 820, the first user is taken from the temporary stack at step 824. This first user is removed from the temporary stack at step 826, and is checked against the master list at step 828. If the then-current user has already been added to the master list at step 828, then the routine returns to step 824, and the next user is taken from the temporary stack. If the then current user has not been added to the master list at step 828, the then current user is added to the master list, with reference to the manager referenced at step 818, at step 830, and the routine returns to step 818.

Figure 9A:
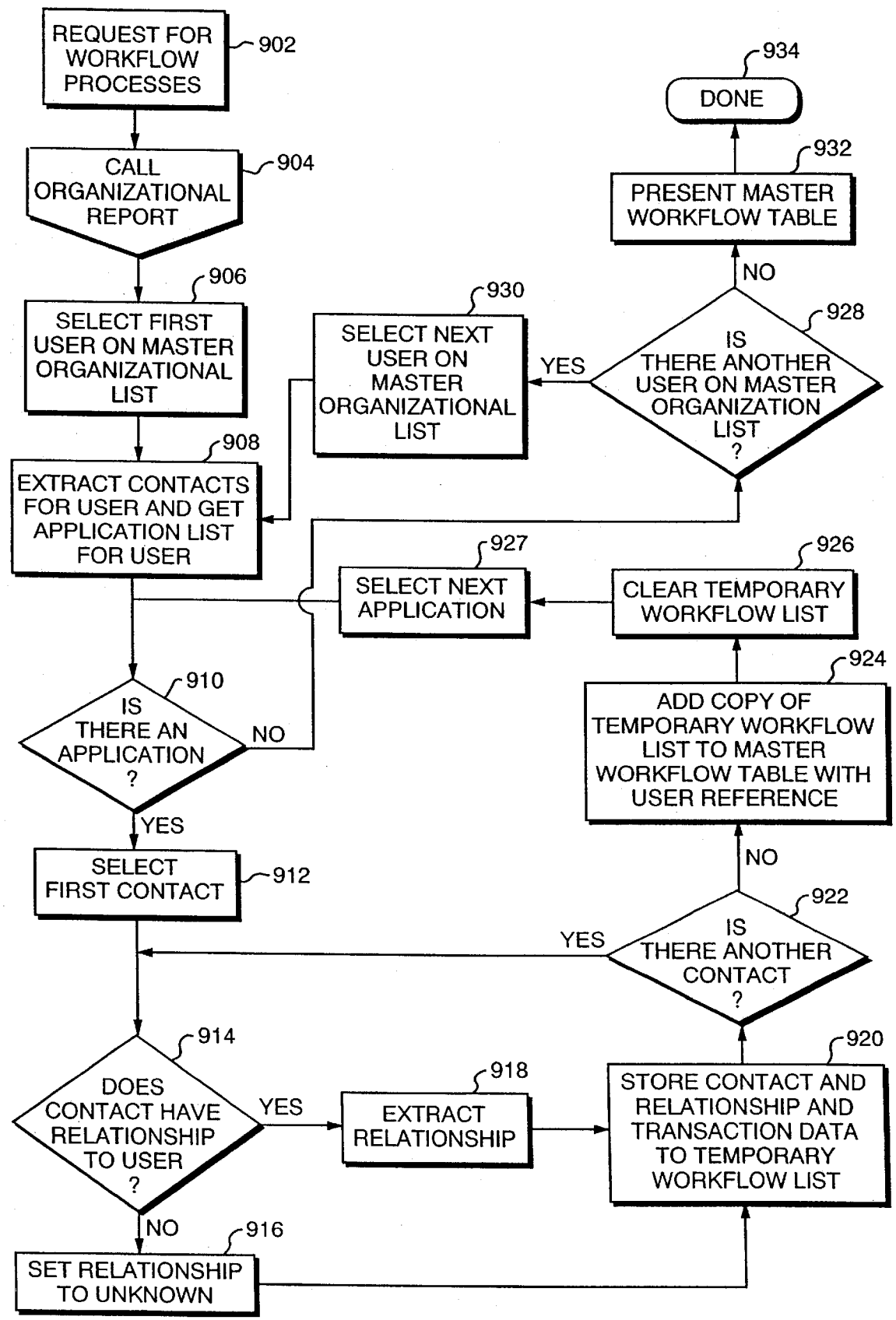
FIG. 9A is a flow chart of a system for querying the database of the present invention in order to derive a map of the work flow between users in the community.
Figure 9B:
FIG. 9B is an exemplary display of an account history used in the present invention.

Referring now to FIG. 9A, there is shown a flow chart of a system for querying the database of the present invention in order to derive a map of the work flow between users in the community. Workflow may be available to the user in a tabulated form, such as that shown in FIG. 9B. Such a workflow tabulation, when pertaining only to the particular user, may be termed an "Account History", as shown in FIG. 9B. The workflow query is issued at step 902 in FIG. 9A. The master list of the organization, as discussed with respect to FIG. 8, is called at step 904, and the first user on the organizational list is selected, at step 906. The contacts for that then-current user are extracted from field 260 at step 908, and an application list is loaded for that then-current user at step 908. The application list includes all tasks which have been initiated by the then-current user, and is generated by reviewing the rank of the then-current user with respect to each task. If there is no application on the application list for the then-current user at step 910, a query is issued at step 928 as to whether there is another user available on the master organization list. If there is not another user, then all users on the master list have had workflow mapped, and the present workflow table is thus the master table at step 932. The process is complete at step 934. If there is another user, that next user on the master list is selected as the then-current user at step 1030, and the query returns to step 908.

Once there is an application at step 910, the first contact is selected from table 260 at step 912. The presence of a relationship of that contact to the then-current user is assessed at step 914. If a relationship does exist, it is extracted from table 260 at step 918, and the query proceeds to step 920. If no relationship exists, the relationship is set to "Unknown" at step 916, and the query proceeds to step 920. At step 920, the contact, relationship, and transaction data are stored on the temporary workflow stack.

Step 922 inquires whether there is another contact present in table 260 for the then-current user. If there is, the routine returns to step 914. If there is not another contact at step 922, a copy of the temporary workflow stack is added to the master workflow stack, with reference to the then-current user, at step 924, and the temporary workflow stack is cleared at step 926. The next application is then selected, and the routine returns to step 910.

Those of ordinary skill in the art will recognize that many modifications and variations of the present invention may be implemented. The foregoing description and the following claims are intended to cover all such modifications and variations.

What is claimed is:

1. A method for building a database that stores information representative of a hierarchical organizational structure of a community of users of a computer network, composing:

registering a first user from the community on a computer applications service by storing information representative of the first user in the database, wherein the computer applications service records initiation and completion of transactions between users in the community;

automatically generating a first transaction record in the database from information inputted by the first registered user, wherein the first transaction record includes at least one field representing an identity of a first unregistered user in the community, a field representing a role of the first registered user in the first transaction; and a field representing a role of the first unregistered user in the first transaction: and inviting the first unregistered user to register with the service by transmitting information representative of the first transaction to the first unregistered user;

creating a second transaction record in the database from information inputted by a registered user initiating a second transaction, wherein the second transaction record includes at least one field representing an identity of a registered user in the community required to approve the second transaction, and a field representing a role of the registered user initiating the second transaction; and predicting an identity of the registered user in the community required to approve the second transaction by querying the database to identify a peer of the registered user initiating the second transaction, and then selecting a manager of the peer as the registered user in the community required to approve the second transaction.

2. A method for building a database that stores information representative of a hierarchical organizational structure of a community of users of a computer network, comprising:

registering a first user from the community on a computer applications service by storing information representative of the first user in the database, wherein the computer applications service records initiation and completion of transactions between users in the community;

automatically generating a first transaction record in the database from information inputted by the first registered user, wherein the first transaction record includes at least one field representing an identity of a first unregistered user in the community, a field representing a role of the first registered user in the first transaction; and a field representing a role of the first unregistered user in the first transaction; and inviting the first unregistered user to register with the service by transmitting information representative of the first transaction to the first unregistered user;

creating a second transaction record in the database from information inputted by a registered user initiating a second transaction, wherein the second transaction record includes at least one field representing an identity of a registered user in the community required to approve the second transaction, and a field representing a role of the registered user initiating the second transaction;

branding the first user as being an invitee of a third party service, wherein the first user is invited by the third party service; and branding each registered user as being an indirect invitee of the third party service.

3. The method of claim 2, further comprising:

registering the first unregistered user wit the service, in response to a reaction of the first unregistered user to the inviting step, by storing information representative of the first unregistered user in the database, thereby transforming the first unregistered user into a second registered user.

4. The method of claim 3, further comprising:

registering further users from the community with the service by:

creating a further transaction record in the database from information inputted by a given registered user, wherein the further transaction record includes at least one field representing an identity of a given unregistered user in the community, a field representing a role of the given registered user in the further transaction, and a field representing a role of the given unregistered user in the further transaction;

inviting the given unregistered user to register with the service by transmitting information representative of the further transaction to the given unregistered user;

registering the given unregistered user with the service, In response to a reaction of the given unregistered user, by storing information representative of the given unregistered user in the database, thereby transforming the given unregistered user into a registered user.

5. The method of claim 2, further comprising:

mapping the hierarchical organizational structure of the community of users by querying the database.

6. The method of claim 2, further comprising:

mapping a work-flow structure of the community of users by querying the database.

7. The method of 2, wherein the community of users corresponds to a set of employees associated with a particular business.

8. A method for building a database that stores information representative of a hierarchical organizational structure of a community of users of a computer network, comprising:

registering a first user from the community on a computer applications service by storing information representative of the first user in the database, wherein the computer applications service records initiation and completion of transactions between users in the community;

automatically generating a first transaction record in the database from information inputted by the first registered user, wherein the first transaction record includes at least one field representing an identity of a first unregistered user in the community, a field representing a role of the first registered user in the first transaction; and a field representing a role of the first unregistered user in the first transaction, wherein the first transaction corresponds to a vacation request made by the first registered user to the first unregistered user, wherein the role of the first registered user in the first transaction corresponds to a transaction requestor, and the role of the first unregistered user in the first transaction corresponds to a transaction approver;

inviting the first unregistered user to register with the service by transmitting information representative of the first transaction to the first unregistered user;

creating a second transaction record in the database from information inputted by a registered user initiating a second transaction, wherein the second transaction record includes at least one field representing an identity of a registered user in the community required to approve the second transaction, and a field representing a role of the registered user initiating the second transaction;

branding the first user as being an invitee of a third party service, wherein the first user is invited by the third party service; and branding each registered user as being an indirect invitee of the third party service.

9. A method for building a database that stores information representative of a hierarchical organizational structure of a community of users of a computer network, comprising:

registering a first user from the community on a computer applications service by storing information representative of the first user in the database, wherein the computer applications service records initiation and completion of transactions between users in the community;

automatically generating a first transaction record in the database from information inputted by the first registered user, wherein the first transaction record includes at least one field representing an identity of a first unregistered user in the community a field representing a role of the first unregistered user in the first transaction; and a field representing a role of the first unregistered user in the first transaction, wherein the first transaction corresponds to a purchase order request made by the first registered user to the first unregistered user, wherein the role of the first registered user in the first transaction corresponds to a transaction requestor, and the role of the first unregistered user in the first transaction corresponds to a transaction approver;

inviting the first unregistered user to register with the service by transmitting information representative of the first transaction to the first unregistered user;

creating a second transaction record in the database from information inputted by a registered user initiating a second transaction, wherein the second transaction record includes at least one field representing an identity of a registered user in the community required to approve the second transaction, and a field representing a role of the registered user initiating the second transaction;

branding the first user as being an invitee of a third party service, wherein the first user is invited by the third party service; and branding each registered user as being an indirect invitee of the third party service.

10. A system for building a database that stores information representative of a hierarchical organizational structure of a community of users of a computer network, comprising:

a server that registers a first user from the community on a computer applications service by storing information representative of the first user in the database, wherein the computer applications service facilitates initiation and completion of transactions between users in the community;

wherein the server creates a first transaction record in the database from information inputted by the first registered user, the first transaction record includes at least one field representing an identity of a first unregistered user in the community, a field representing a role of the first registered user in the first transaction; and a field representing a role of the first unregistered user in the first transaction;

wherein the server invites the first unregistered user to register with the service by transmitting information representative of the first transaction to the first unregistered user;

wherein the server creates a second transaction record in the database from information inputted by a registered user initiating a second transaction, wherein the second transaction record includes at least one field representing an identity of a registered user in the community required to approve the second transaction, and a field representing a role of the registered user initiating the second transaction;

wherein the server brands the first user as being an invitee of a third party service, wherein the first user is invited by the third party service and brands each registered user as being an indirect invitee of the third party service; and wherein the server registers the first unregistered user with the service, in response to a reaction of the first unregistered use to receipt of the information representative of the first transaction, by storing information representative of the first unregistered user in the database, thereby transforming the first unregistered use user into a second registered user.

11. A system for building a database that stores information representative of a hierarchical organizational structure of a community of users of a computer network, comprising:

means for registering a first user from the community on a computer applications service by storing information representative of the first user in the database, wherein the computer applications service facilitates initiation and completion of transactions between users in the community;

means for creating a first transaction record in the database from information inputted by the first registered user, wherein the first transaction record includes at least one field representing an identity of a first unregistered user in the community, a field representing a role of the first registered user in the first transaction; and a field representing a role of the first unregistered user in the first transaction; and means for inviting the first unregistered user to register with the service by transmitting information representative of the first transaction to the first unregistered user;

means for creating a second transaction record in the database from information inputted by a registered user initiating a second transaction, wherein the second transaction record includes at least one field representing an identity of a registered user in the community required to approve the second transaction, and a field representing a role of the registered user initiating the second transaction;

means for branding the first user as being an invitee of a third party service, wherein the first user is invited by the third party service and for branding each registered user as being an indirect invitee of the third party service; and means for registering the first unregistered user with the service, in response to a reaction of the first unregistered use to the inviting step, by storing information representative of the first unregistered user in the database, thereby transforming the first unregistered use into a second registered user.

12. A method for building a database that stores information representative of a hierarchical organizational structure of a community of users of a computer network, comprising:

storing information representative of the first user from the community in the database, wherein the computer applications service records initiation and completion of transactions between users in the community;

creating a first transaction record in the database from information inputted by the first user, wherein the first transaction record includes at least one field representing an identity of a second user in the community, a field representing a role of the first user in the first transaction; and a field representing a role of the second user in the first transaction;

transmitting information representative of the first transaction to the second user;

storing further information representative of the hierarchical organizational structure of the community of users by:

creating a her transaction record in the database from information inputted by a user initiating the further transaction, wherein the further transaction record includes at least one field representing an identity of a user in the community required to approve the further transaction, a field representing a role of the user initiating the further transaction in the further transaction, and a field representing a role of the user initiating the further transaction in the further transaction; and branding the first user as being an invitee of a third party service, wherein the first user is invited by the third party service and branding each registered user as being an indirect invitee of the third party service.

13. A system for building a database that stores information representative of a hierarchical organizational structure of a community of users of a computer network, comprising:

means for storing information representative of the first user from the community in the database, wherein the computer applications service records initiation and completion of transactions between users in the community;

means for automatically generating a first transaction record in the database from information inputted by the first user, wherein the first transaction record includes at least one field representing an identity of a second user in the community, a field representing a role of the first user in the first transaction; and a field representing a role of the second user in the first transaction;

means for transmitting information representative of the first transaction to the second user;

means for storing further information representative of the hierarchical organizational structure of the community of users, said means for storing further information including:

means for creating a further transaction record in the database from information inputted by a user initiating the further transaction, wherein the further transaction record includes at least one field representing an identity of a user in the community required to approve the further transaction, a field representing a role of the user initiating the further transaction in the further transaction, and a field representing a role of the user initiating the further transaction in the further transaction; and means for branding the first user as being an invitee of a third party service, wherein the first user is invited by the third party service and branding each registered user as being an indirect invitee of the third party service.

\* \* \* \* \*

UNITED STATES PATENT AND TRADEMARK OFFICE
CERTIFICATE OF CORRECTION

PATENT NO. : 6,745,196 B1
DATED : June 1, 2004
INVENTOR(S) : Colyer et al.

It is certified that error appears in the above-identified patent and that said Letters Patent is hereby corrected as shown below:

Column 15,
Line 46, "wit" should be -- with --

Column 17,
Line 2, "unregistered" should be -- registered --

Column 18
Line 2, please delete "use"
Line 62, "her" should be -- further --

Signed and Sealed this

Twelfth Day of October, 2004

JON W. DUDAS
*Director of the United States Patent and Trademark Office*